(12) United States Patent
Ajoku et al.

(10) Patent No.: US 9,152,729 B2
(45) Date of Patent: Oct. 6, 2015

(54) AUDITING OF WEBPAGES

(71) Applicant: BRIGHTEDGE TECHNOLOGIES, INC., San Mateo, CA (US)

(72) Inventors: Emeka Ajoku, San Mateo, CA (US);
Lemuel S. Park, Cerritos, CA (US);
Sammy Yu, San Mateo, CA (US);
Jimmy Yu, Foster City, CA (US);
Thomas J. Ziola, Menlo Park, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 98 days.

(21) Appl. No.: 13/648,962

(22) Filed: Oct. 10, 2012

(65) Prior Publication Data

US 2013/0091118 A1  Apr. 11, 2013

Related U.S. Application Data

(60) Provisional application No. 61/545,475, filed on Oct. 10, 2011, provisional application No. 61/640,706, filed on Apr. 30, 2012.

(51) Int. Cl.
*G06F 17/30* (2006.01)

(52) U.S. Cl.
CPC .............................. *G06F 17/30887* (2013.01)

(58) Field of Classification Search
CPC ................... G06F 17/30887; G06F 17/30899
See application file for complete search history.

(56) References Cited

U.S. PATENT DOCUMENTS

| | | | |
|---|---|---|---|
| 6,601,066 B1 | 7/2003 | Davis-Hall | |
| 6,847,967 B1 | 1/2005 | Takano | |
| 6,895,551 B1* | 5/2005 | Huang et al. | 715/205 |
| 2002/0156799 A1 | 10/2002 | Markel et al. | |
| 2008/0120305 A1 | 5/2008 | Sima et al. | |
| 2011/0093773 A1* | 4/2011 | Yee | 715/235 |
| 2011/0119220 A1* | 5/2011 | Seolas et al. | 706/47 |
| 2011/0258535 A1* | 10/2011 | Adler et al. | 715/235 |

FOREIGN PATENT DOCUMENTS

WO  2008/031117 A2  3/2008

OTHER PUBLICATIONS

International Search Report dated Mar. 25, 2013 as received in Application No. PCT/US2012/059575.
Written Opinion of the International Searching Authority dated Mar. 25, 2013 as received in Application No. PCT/US2012/059575.

* cited by examiner

*Primary Examiner* — Hung Q Pham
(74) *Attorney, Agent, or Firm* — Maschoff Brennan

(57) ABSTRACT

A method of performing an audit of auditable objects within webpages of a website includes identifying an auditable object marker and crawling a portion of a website to identify multiple webpages of the website that each include the auditable object marker. The method may further include configuring an audit rule to determine a property of an auditable object of each of the webpages where the auditable object marker is associated with the auditable object. The method may further include performing an audit of each of the webpages according to the audit rule to determine the property of the auditable object for each of the webpages and grouping the webpages based on the property of the auditable object for each of the webpages.

19 Claims, 6 Drawing Sheets

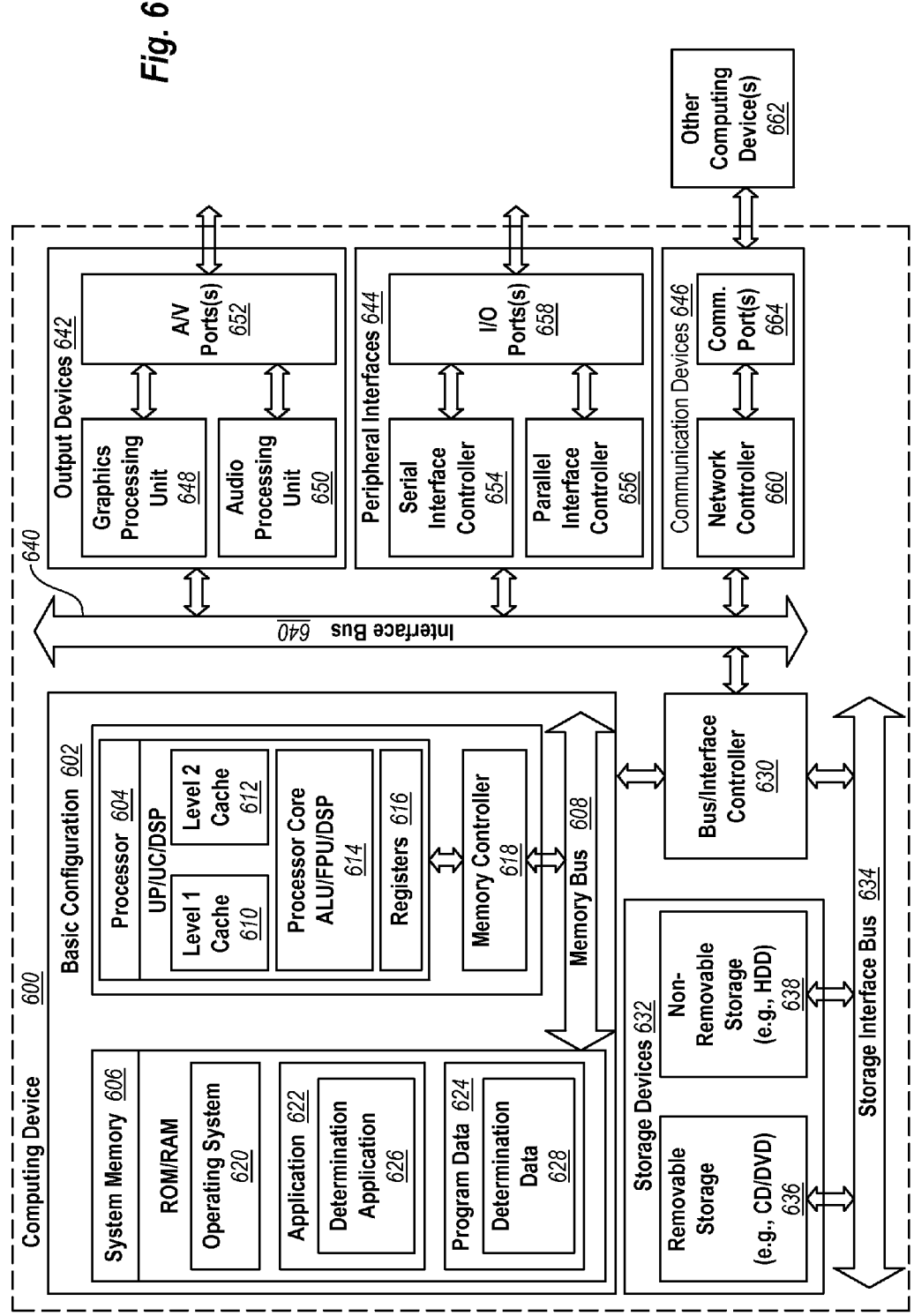

AUDITING OF WEBPAGES

CROSS-REFERENCE TO RELATED APPLICATIONS

The present application claims priority to U.S. Provisional Application No. 61/545,475, filed Oct. 10, 2011, and U.S. Provisional Application No. 61/640,706, filed Apr. 30, 2012. The foregoing applications are incorporated herein by reference.

BACKGROUND

1. Field of the Invention

The present invention relates to a system and method for auditing the effectiveness of websites.

2. The Relevant Technology

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Web Pages for people to visit. Currently, companies leverage blogs, social media, video sharing, mobile content and ads, display ads, and many other channels in order to seek potential customers and conduct business.

One difficulty that comes with using the various types of social media to advertise or conduct business online is that it is often difficult for a company to identify how to most appropriately and advantageously use the social media for their desired purposes. For example, many types of social media, such as Facebook or other social media sites, use predetermined, preferred, and/or recommended templates, designs, and/or other digital components for webpages and website combined with information from a company's webpages. Without the ability to determine how to best optimize those pages for performance in social media sites and the like, a company's use of social media may be limited or otherwise impaired. Furthermore, the large number of alternative templates, designs, and/or other digital components for webpages and websites intended to optimize results on diverse social media platforms are difficult to administratively create, deploy, inventory, update, and, manage across divers systems on a large scale. As such, there is a need for a system and method for optimizing a website for related social media and/or other media applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, a method of performing an audit of auditable objects within webpages of a website includes identifying an auditable object marker and crawling a portion of a website to identify multiple webpages of the website that each include the auditable object marker. The method may further include configuring an audit rule to determine a property of an auditable object of each of the webpages where the auditable object marker is associated with the auditable object. The method may further include performing an audit of each of the webpages according to the audit rule to determine the property of the auditable object for each of the webpages and grouping the webpages based on the property of the auditable object for each of the webpages.

In another embodiment, a method of performing an audit of auditable objects within webpages of a website includes identifying multiple webpages from a website associated with a social media website and configuring an audit rule to determine a property of an auditable object of each of the webpages where the auditable object is associated with the social media site. The method may further include performing an audit of each of the webpages according to the audit rule to determine the property of the auditable object for each of the webpages and grouping the webpages based on the property of the auditable object for each of the webpages.

In another embodiment, a method of performing an audit of auditable objects within webpages includes identifying an auditable object marker and receiving multiple unpublished webpages. The method may further include determining a subset of the unpublished webpages that includes the auditable object marker and configuring an audit rule to determine a property of an auditable object of each of the webpages of the subset of the unpublished webpages. The method may further include performing an audit of each of the webpages of the subset of the unpublished webpages according to the audit rule to determine the property of the auditable object for each of the webpages of the subset of the unpublished webpages.

Additional features and advantages of the invention will be set forth in the description that follows. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 is a block diagram of an example computing device configured to implement some embodiments described herein, all arranged in accordance with at least some embodiments described herein.

DETAILED DESCRIPTION

Generally, embodiments disclosed herein relate to methods of performing an audit of multiple webpages of a website to determine errors in auditable objects within the webpages of the website. In particular, the audit may be performed to determine a property of an auditable object within the webpages of the website. For example, the auditable objects within a webpage may be social media objects, such as open graph tags that allow a social media site to extract information from the auditable objects about the webpage for displaying in the social media website. A property of an open graph tag may be being included on a webpage and/or including specified content related to the webpage. When the auditable objects contain errors or are not included within the webpages, the social media website may not correctly display or display any information about the webpage when the social media website is linked to the webpage. As an example, a user of a social media site may indicate that it approves of or likes a webpage. The social media site may then include a link from a user's page of the social media website to the webpage and may include information about the webpage around the link to the webpage. The information from the webpage may be obtained from the auditable objects. When errors are present in the auditable objects and/or the auditable objects are not included in the webpage, the social media website may not properly display information about the webpage. Improperly displayed information may reduce the benefit to the webpage of having the webpage linked to and/or displayed in the social media website.

Auditing a webpage may include crawling a portion of a website to identify webpages of the website that each include the auditable object marker. An audit rule may be configured to determine a property of an auditable object of each of the webpages. After identifying the webpages and configuring the audit rule, an audit may be performed on each of the webpages according to the audit rules in order to determine the property of the auditable object included in each of the webpages. The webpages may then be grouped based on the property of the auditable object included in each of the webpages or based on the properties of the webpages themselves.

Auditing the webpages may allow for errors to be identified within the webpages and corrections made to the identified errors. Correcting the errors may allow the webpages to be more compatible with other website and related applications, better present information, or otherwise increase the value or performance of the webpages.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
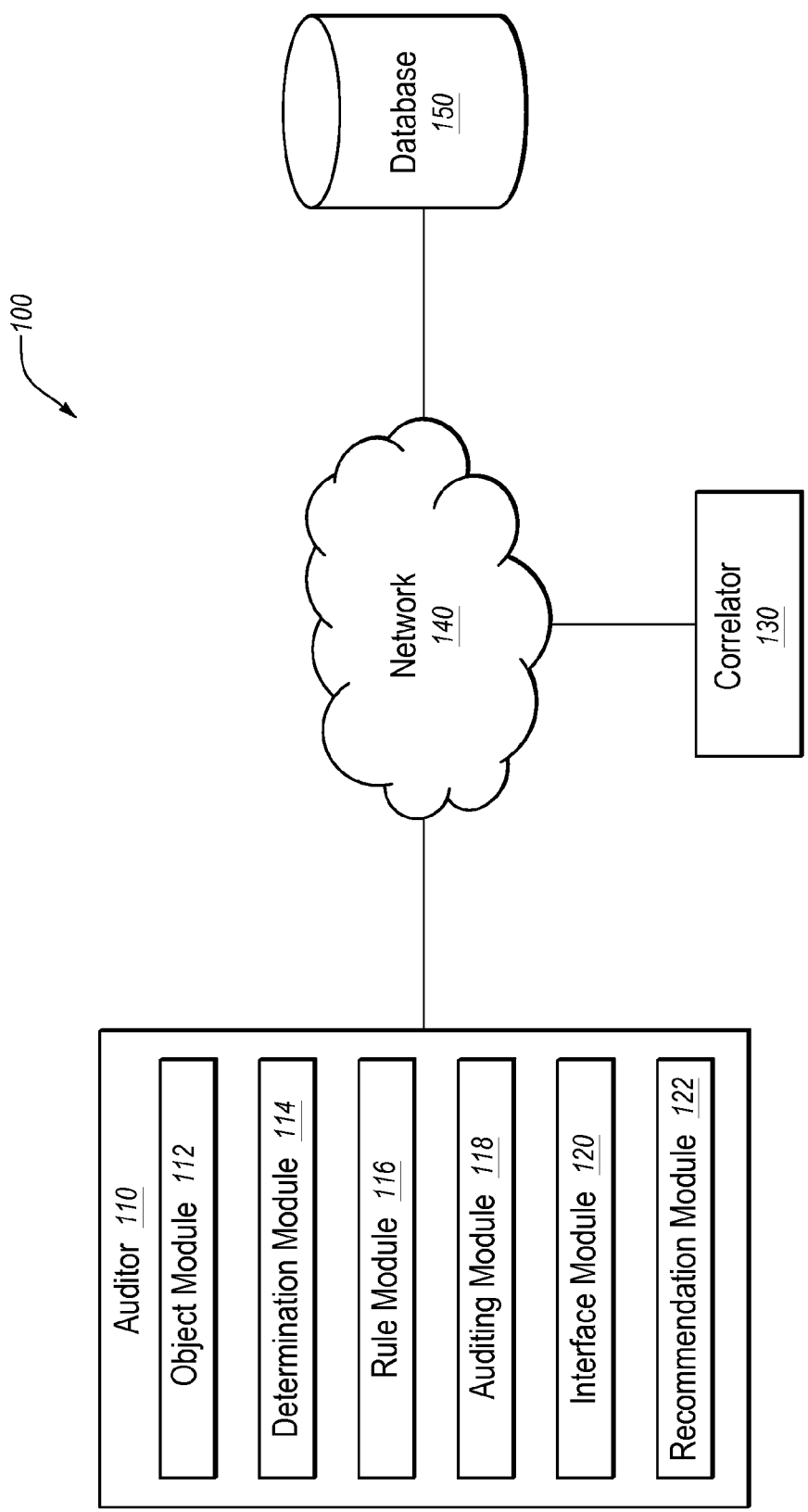
FIG. 1 is a block diagram of an example auditing system.

FIG. 1 is a block diagram of example auditing system 100, arranged in accordance with at least some embodiments described herein. In some embodiments, a network 140 may be used to connect the various parts of the system 100 to one another, such as between a database 150, an auditor 110, and a correlator 130.

The network 140 may include the Internet, which may include a global internetwork formed by logical and physical connections between multiple wide area networks and/or local area networks and may optionally include the World Wide Web ("Web"), that may include a system of interlinked hypertext documents accessed via the Internet. Alternately or additionally, the network 140 may include one or more cellular RF networks and/or one or more wired and/or wireless networks such as, but not limited to, 802.xx networks, Bluetooth access points, wireless access points, IP-based networks, or the like. The network 140 may also include servers that enable one type of network to interface with another type of network.

The auditor 110 may be configured to receive webpages, either unpublished or published over the network 140. The auditor 110 may be further configured to audit the webpages, or more particularly, audit auditable objects of the webpages based on selected audit rules. The auditor 110 may include various modules, such as an object marker module 112, a determination module 114, a rule module 116, an auditing module 118, an interface module 120, and a recommendation module 122, which may be used together, separately, or in some combination to perform an audit of a webpage or webpages.

The interface module 120 may be configured to receive a webpage or multiple webpages over the network 140. The webpages may be any sort of material that may be published on a network, for example the Internet. The webpages may be unpublished webpages, for example, webpages that have not be published on the Internet or published webpages that are published on the Internet that are part of a website. A website may be compilation of one or more webpages that are associated and accessed through a related uniform resource locator.

In some embodiments, the interface module 120 may receive the webpages from the database 150. The database 150 may be part of a webserver that stores webpages. Alternately or additionally, the interface module 120 may receive the webpages from another system that generates, analyzes, configures, or otherwise affects webpages. For example, the interface module 120 may receive the webpages from or receive an indication of where to locate the webpages from a search engine optimization system, a content management system (CMS), a multi-channel reporting tool, a marketing automation tool, a third party workflow management tool, a web analytics system, an advertising system, a social media engagement and sentiment analysis system, a social media platform, or some other type of system. In some embodiments, the system 100 may not include the network 140. In these and other embodiments, the database 150 may be communicatively coupled to the auditor 110. For example, the auditor 110 may be coupled with a CMS. In these and other embodiments, the auditor 110 may audit a webpage and/or webpage template as the webpage and/or template at any phase during construction of the webpage and/or webpage template, such as during an editorial process, a building process, a pre-production process, or a post-production process.

Alternately or additionally, the system 100 may be part of another system. In these and other embodiments, the auditor 110 and the database 150 may be part of a search engine optimization system, a content management system (CMS), a multi-channel reporting tool, a marketing automation tool, a third party workflow management tool, a web analytics system, an advertising system, a social media engagement and sentiment analysis system, a social media platform, or some other type of system.

The interface module 120 may also be configured to receive data for the other modules within the auditor 110. For example, the interface module 120 may receive auditable object markers or auditable objects for use by the object module 112. As another example, the interface module 120 may receive indications of how audit rules are to be configured.

The object module 112 may be configured to identify one or more auditable object markers that may be used to identify webpages that may contain auditable object. In some embodiments, auditable object markers may be code segments of a webpage that may be used to determine when to audit the webpage. The auditable object markers may be multiple lines of code or a single line of code. For example, the auditable object markers may be a single line of code that refers to the webpage associating with other websites or content on the webpage.

In some embodiments, an auditable object marker within a webpage may include multiple portions of code that are not contiguous. For example, an auditable object marker may be multiple lines of code that refer to the webpage associating with other websites or content on the webpage. Consider as an example, a webpage that includes multiple lines of code associated with a social media website that indicates that the webpage includes the ability for a user to indicate approval of the webpage using the social media website. The auditable object marker may include multiple lines of code associated with a social media website.

As a more particular example, an auditable object marker may be one of multiple lines of code that refers to a webpage associating with Facebook. Various lines of code that may indicate that the webpage may contain a reference or link with Facebook, may include, but not be limited to, xmlns:og, meta property="og:, meta property="fb:, facebook.com/plugins, <fb:, class="fb-, among others.

The object module 112 may also be configured to determine one or more auditable objects that may be audited by the auditor 110. The auditable objects may be associated with the auditable object markers identified by the object module 112. In particular, the auditable object markers may be used by the auditor 110 to indicate when the webpage may include auditable objects. For example, an auditable object marker may indicate that a webpage is associated with a social media website. The auditable object marker may indicate that the webpage may include tags for the social media website that may provide information in a form for use by the social media website. In some embodiments, the auditable object marker may indicate that a webpage may include an auditable object, but the webpage may not include an auditable object. In these and other embodiments, the non-inclusion of an auditable object when the webpage includes an auditable object marker may be indicated as an error in the webpage. In some embodiments, an auditable object marker may be an auditable object.

In some embodiments, the auditable object may be single line of code or multiple lines of code. As an example, an auditable object marker may be multiple lines of code, such as a header section of the webpage. The header section of the webpage may include multiple lines of code that include information about the webpage that may be used by other websites when the other websites are providing information about the webpage.

As another particular example, an auditable object may be a tag or a group of tags used to provide information to another website, such as Facebook. The tags may include open graph tags, such as but not limited to, <meta property="og:title" content="The Rock"/>, <meta property="og:type" content="movie"/>, <meta property="og:url" content="http://www.imdb.com/title/tt0117500/"/>, <meta property="og:image" content="http://ia.media-imdb.com/rock.jpg"/>, <meta property="og: site_name" content="IMDb"/>, <meta property="fb:admins" content="USER_ID"/>, <meta property="fb:app_id" content="YOUR_APP_ID"/>, <meta property="og:description", content="Mr. Bean likes to dance and sing like a sailor."/>.

In some embodiments, a user may provide an auditable object to the auditor 110 by way of the interface module 120. In these and other embodiments, the auditor 110 may audit a webpage using the provided auditable object. For example, a provided auditable object may be a tag unique to a user and a webpage associated with the user.

The determination module 114 may be configured to identify webpages of a website that include the auditable object marker identified by the object module 112. The determination module 114 may identify webpages that include the auditable object marker from a selected portion of webpages of the website or from the entire website. For example, the determination module 114 may identify the webpages that include the auditable object marker that are part of a certain domain, that relate to a certain product, or for any other selected portion of a website. Alternately or additionally, the determination module 114 may identify the webpages that include the auditable object marker that are part of a site map that may be supplied by a user of the system 100 and received by the interface module 120.

In some embodiments, the determination module 114 may identify the webpages that include the auditable object marker by crawling the website. In some embodiments, crawling the website to identify the webpages that include the auditable object marker may include resolving and rendering non-html code segments. In some embodiments, the determination module 114 may determine webpages to crawl based on a site map. Alternately or additionally, the determination module 114 may determine webpages to crawl based on an initial seed set of URLs within the website. The seed set may originate from multiple sources, such as previous crawls of the website, URLs within the website previously collected in the database 150 and/or the auditor 110, and/or URLs from independent third-party sources and applications. The determination module 114 may send the identified webpages to the rule module 116.

The rule module 116 may be configured to configure audit rules to determine a property of an auditable object of the identified webpages. The property of the auditable object of the identified webpages may be based on the auditable object identified by the object module 112. The property of the auditable object of the identified webpages may be any characteristic of the identified auditable object. More particularly, the property of the auditable object of the identified webpages may be any characteristic or portion of the auditable object. For example, when the auditable object is for a tag for a social media website, the property of the auditable object may be whether the identified webpages include or do not include the tag (i.e. the auditable object) that may be used by the social media website to obtain information about the identified webpages.

As another example, for an auditable object that is a tag with a content field, a property of the auditable object may be whether the content field contains content and when the content field contains content, the content of the content field. As another example, for an auditable object that is a tag, such as "meta property="og:title" content="The Rock"", a property of the tag may be the substance of a content field of the tag, namely "The Rock." In another example, for an auditable object that is a tag, such as, "meta property="og:title" content="", a property of the tag may be the substance of a content field of the tag, which here may be null indicating that the content portion of the tag does not include content.

The rule module 116 may configure multiple audit rules that each determine a property or multiple properties of one or more auditable objects of the identified webpages. In some embodiments, the audit rules may rely on properties of auditable object determined by other audit rules. For example, one audit rule may only be used to audit a content of an auditable object after another audit rule is used to confirm the auditable object is part of the identified webpages.

In some embodiments, the rule module 116 may accept input from a user of the system 100 when configuring the audit rules. In these and other embodiments, a user may be allowed to select and deselect predetermined audit rules, propose audit rules, and provide other input regarding the audit rules. Alternately or additionally, the rule module 116 may allow users to provide and/or select among properties for auditable objects for which audit rules may be configured. For example, a user may select that a property for an auditable object be the inclusion of the auditable object within a webpage. Alternately or additionally, a user may select that a property of an auditable object be a specific content of an auditable object.

In some embodiments, the rule module 116 may accept input from a social media service, an SEO platform provider, a CMS provider, and/or some other entity when configuring the audit rules. In these and other embodiments, one or more of the aforementioned entities may select and deselect predetermined audit rules, propose audit rules, and provide other input regarding the audit rules or provide and/or select among properties for auditable objects for which audit rules may be configured.

The auditing module 118 may be configured to audit each of the identified webpages based on the audit rules configured by the rule module 116 to determine the properties of the auditable objects of the identified webpages. The auditing module 118 may also be configured to analyze the property for each auditable object of each of the identified webpages to detect errors in the identified webpages. Detected errors in a webpage may depend on properties, auditable objects, audit rules, and/or auditable object marker within the webpage, as well as input from a user. For example, a webpage may have an error when the auditable object is a tag used by a social media webpage to pull information about the webpage and the tag is not located on the webpage, the tag is formatted incorrectly, the tag does not contain correct information, among other reasons.

In some embodiments, the detected errors may be classified according to severity. For example, the detected errors may be labeled as severe, moderate, or mild. Severe errors may have a greater effect on interactions between the webpage and an associated webpage or website related error than mild errors. In some embodiments, the level of severity for an error may be selected by the system 100. In these and other embodiments, the level of severity for an error of an auditable object selected by the system may be based on data, algorithms, and/or models about the impact of the auditable object on metrics, such as search engine rank of keywords related to the auditable object or the webpage, organic or paid search conversions on the webpage, revenue generated by the webpage, engagement by visitors on the webpage, sentiment impact of the webpage, and/or combinations of these and other metrics. In other embodiments, the level of severity for an error may be selected by a user.

The auditing module 118 may also be configured to group the identified webpages based on the property for the auditable object for each of the identified webpages. Alternately or additionally, the auditing module 118 may be configured to group the identified webpages based on the errors for each of the identified webpages. In some embodiments, the auditing module 118 may group the identified webpages based on which of the identified webpages include the same errors, which of the identified webpages include errors with the same severity, among other things. In some embodiments, the auditing module 118 may group the identified webpages based on the errors for each of the identified webpages in any logical way to allow patterns to be identified. In some embodiments, the auditing module 118 may also be configured to group the identified webpages based on properties inherent within the webpages. For example, the auditing module 118 may group webpages based on the webpages containing specified keywords, the webpages related to similar products or discussing similar themes.

Based on the grouping of the identified webpages, data regarding the errors within the website or templates used to construct the webpages may be identified. For example, in some embodiments, information about the templates used to construct the webpages may correlated with the grouping of the identified webpages to determine if an error exists in a template used to construct the identified webpages. Alternately or additionally, the groups of the identified webpages may be correlated with groupings of the webpages supplied by a user or some other system that may be used to determine when a template contains errors. Alternately or additionally, the groups of the identified webpages may be correlated with an entity, such as a person, a group of people, a corporation, or some other congregation, responsible for creating and maintaining webpages to determine which entities are more likely to create auditable objects that may contain errors or webpages that may contain errors. Alternately or additionally, heuristics or some other model may be used to determine commonalities between identified webpages grouped together to determine when a template may contain errors.

The auditing module 118 may further be configured to provide the interface module 120 and the recommendation module 122 with information about the errors. For example, the auditing module 118 may provide information concerning a number of total errors, a number of errors of a certain severity, a number of webpages with errors, a number of and a type of errors for a certain webpage or classification of webpages, templates with errors, percent of webpages that contain errors, among other information. The interface module 120 may be configured to present the information from the auditing module 118 to a user.

In some embodiments, the auditor 110 may run a second audit on the website using the same auditable object. In these and other embodiments, the auditing module 118 may compare the number of errors from the second audit to the number of errors from the first audit. Alternately or additionally, the auditing module 118 may compare a number of errors of a certain severity, a number of webpages with errors, a number of and a type of errors for a certain webpage or classification of webpages, templates with errors, percent of webpages that contain errors, among others for the first audit and the second audit. The auditing module 119 may send the comparisons between the first and second audits to the interface module 120 for the interface module 120 to present. By running a second audit, the auditor 110 may determine whether changes have improved the website.

The recommendation module 122 may be configured to generate a correction report that includes recommendations for correcting the errors in the identified webpages. The recommendation module 122 may prioritize the recommendations based on numerous factors. For example, the recommendation module 122 may prioritize the errors for correction based on the severity of the errors, errors that affect templates, errors that affect certain page types, expected revenue impact of the error on the webpage, revenue or impact of the webpage generally, a difficulty of addressing the error, and a content and performance of the webpage that contains the error. Alternately or additionally, the recommendation module 112 may prioritize the errors for correction based on the groupings of the webpages that contain the errors. For example, all of the errors in webpages in one group of webpages grouped by the auditing module 118 may be scheduled for correction before errors in webpages in other groups are scheduled for correction. Alternately or additionally, the recommendation module 112 may prioritize the errors for correction based on any other group discussed herein.

The recommendation module 122 may be configured to send recommendations to the interface model 120. The interface module 120 may present the recommendations to another system that may be configured to act on the recommendations to correct the errors of the webpages. In some embodiments, the interface module 120 may send the recommendations to systems as a content management system (CMS), tracking system, ticketing system, or other external system. Alternately or additionally, the content management system (CMS), tracking system, ticketing system, and other systems may be internal to the system 100.

In some embodiments, where the auditable object relates to the identified webpages association with a social media website, the content and performance of the webpage that contains the error may be determined based on how much the social media website references the webpage, how many indications of approval the webpage obtains from the social media website, among other interactions between the social media website and the webpage.

The revenue or impact of the webpage generally may be determined by analyzing the value of the webpage as indicated by a number of conversions generated by the webpage, where a conversion is an action taken with respect to the webpage by a visitor to the webpage; a number of visitors and/or visits to the webpage; revenue generated by the webpage; ranking in search results for keywords associated with the webpage; among other factors that may impact the webpage.

In some embodiments, the recommendation engine 122 may be further configured to determine or estimate an impact on revenue generated by the identified webpage by correcting errors on the identified webpage. The impact on revenue may be determined using the correlator 130. The correlator 130 may be configured to correlate changes in traffic, conversions, ranking of search results for keywords associated with the webpage, among other things, to correction of errors on the webpage. The value of the changes traffic, conversions, ranking of search results for keywords associated with the webpage, among other things, may be calculated or estimated to determine the estimate or relative impact on revenue generated by the identified webpage.

The recommendation module 122 may be further configured to assign tasks regarding correcting errors within selected or all of the identified webpages. The assigned tasks may be distributed to multiple different entities. The recommendation module 122 may further be configured to monitor the assigned tasks and close the assigned tasks when the tasks are completed. Modifications, additions, or omissions may be made to the system 100 without departing from the scope of the present disclosure.

As indicating herein, the system 100 may perform the audit of a website by auditing the individual webpages herein. In particular, the system 100 may be automated to discover the webpages within a website to audit, audit the webpages, and provide recommendations for correcting the webpages. This automation may reduce an amount of effort required to audit a website on a webpage per webpage basis. In some embodiments, the system 100 may include a webpage publisher, such as a content management system (CMS). In these and other embodiments, the system 100 may discover the webpages to audit, audit the webpages, correct the webpages, and republish the corrected webpages.

In some embodiments, the system 100 may be used to audit webpages that have been published to a network. In these and other embodiments, the system 100 may audit the webpages to detect errors and correct the errors while the webpage is published. Alternately or additionally, the system 100 may be used to audit webpages that have not been published to a network. In these and other embodiments, the system 100 may audit the webpages before publishing the webpages to reduce a number of webpages that may be published with errors as determined by audit rules within the system 100. In these and other embodiments, the system 100 may contain components for generating and/or publishing webpages, such as a CMS.

Figure 2:
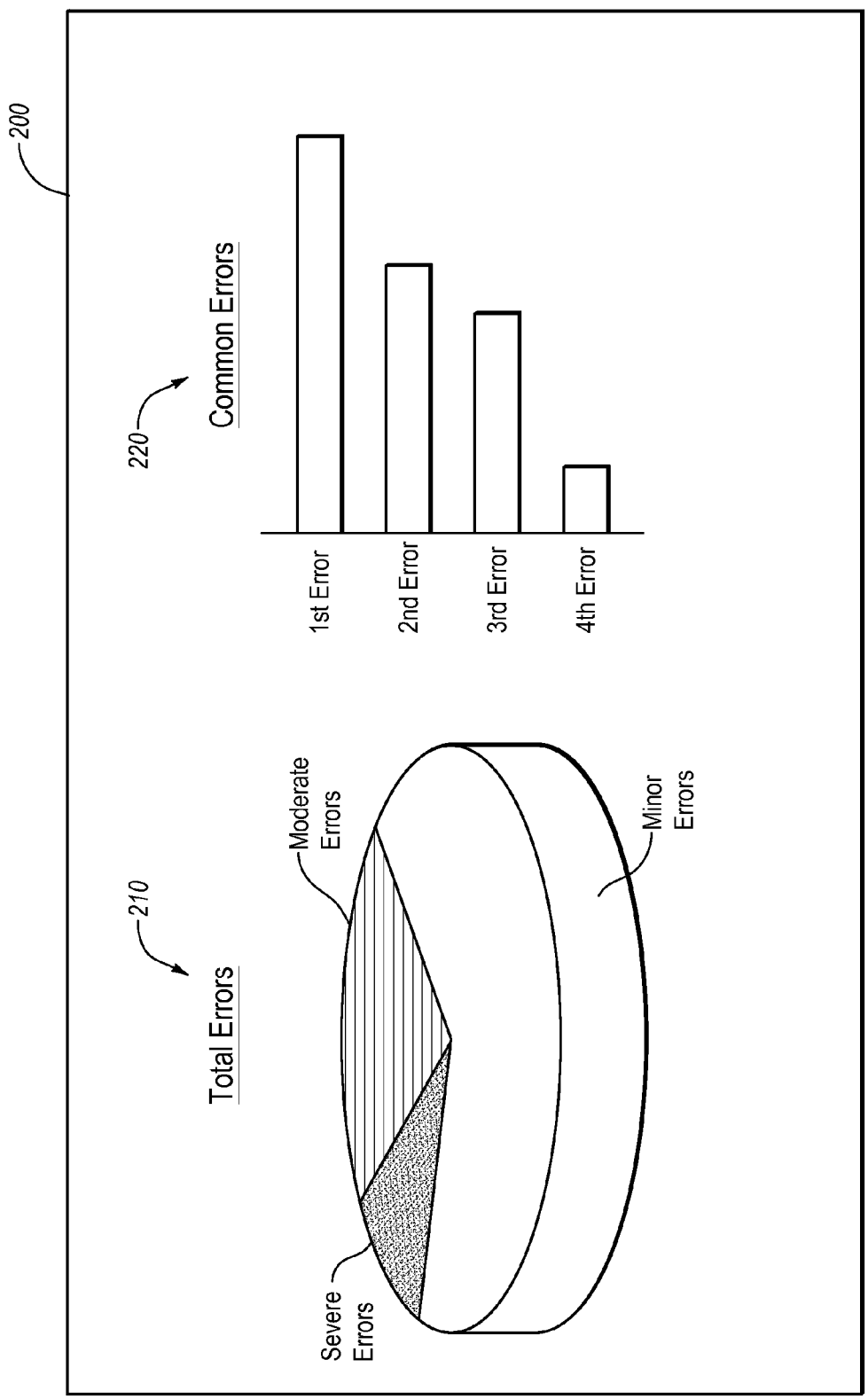
FIG. 2 illustrates an example report generated by the example auditing system of FIG. 1.

FIG. 2 illustrates an example report 200 generated by the example auditing system 100 of FIG. 1, arranged in accordance with at least some embodiments described herein. For example, the report 200 may illustrate a form by which the interface module 120 of FIG. 1 may present information from the auditing module 118 of FIG. 1 to a user. The report 200 may include a pie chart 210 and a bar graph 220. The pie chart 210 may illustrate a total number of errors detected while auditing multiple webpages. In particular, the pie chart 210 may illustrate the number of severe errors, moderate errors, and minor errors. In some embodiments, a user may click on different portions of the pie chart 210 to access a listing of the webpages and/or a listing of groups of common webpages with type of errors selected. The bar graph 220 may illustrate the number of common errors detected while auditing the webpages. As illustrated, the errors may be grouped together based on the error type. In some embodiments, a user may click on different bars in the bar chart 210 to access the webpage that contains one or more of the type of errors selected.

Figure 3:
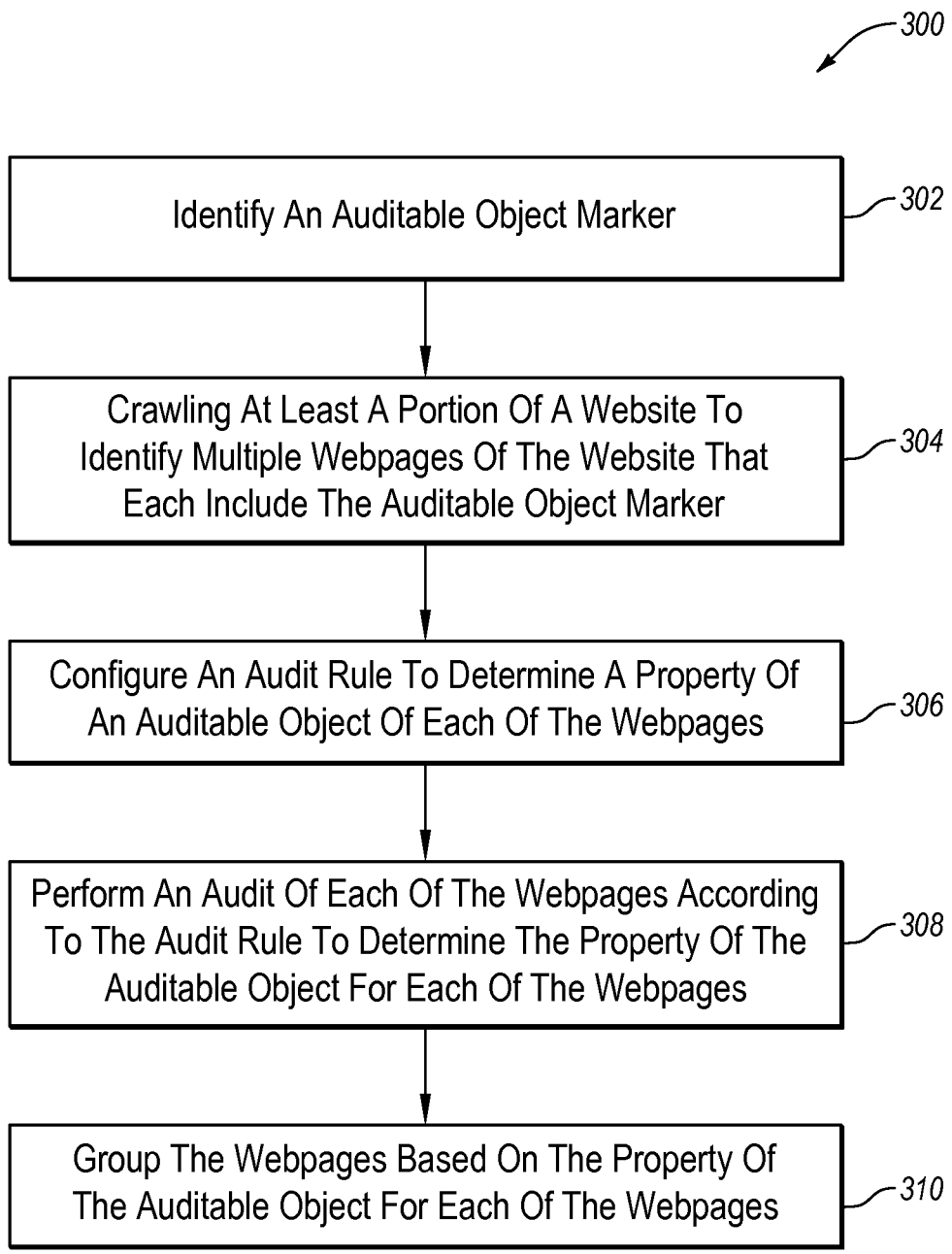
FIG. 3 is a flow chart of an example method of performing an audit of auditable objects.

FIG. 3 is a flow chart of an example method 300 of performing an audit of auditable objects, arranged in accordance with at least some embodiments described herein. The method 300 may be implemented, in some embodiments, by an auditing system, such as the system 100 of FIG. 1. For instance, the auditor 110 within the system 100 of FIG. 1 may be configured to execute computer instructions to cause the system 100 to perform operations for performing an audit of a website, as represented by one or more of blocks 302, 304, 306, 308, and 310 of the method 300. Although illustrated as discrete blocks, various blocks may be divided into additional blocks, combined into fewer blocks, or eliminated, depending on the desired implementation.

The method 300 may begin at block 302, where an auditable object marker may be identified. An auditable object marker may be a line of code or multiple lines of html code within a webpage. Alternately or additionally, the auditable object maker may be some other portion of a webpage. The auditable object marker may indicate the association of the webpage that includes the auditable object with another website. For example, the other website may be a social network website and the auditable object marker may be a portion of the webpage that references the social network website. The auditable object marker may also indicate a presence or a presumed presence of an auditable object.

At block 304, at least a portion of a website may be crawled to identify multiple webpages of the website that each include the auditable object marker. In some embodiments, crawling the website may include resolving and rendering non-html code segments to identify one or more of the webpages. In some embodiments, crawling the website may be performed based on a sitemap of the website. In some embodiments, a selected portion of the website may be crawled in lieu of the entire website.

At block 306, an audit rule may be configured to determine a property of an auditable object of the webpages, the auditable object marker associated with the auditable object. The property of the auditable object may be the inclusion of the auditable object in the webpage. For example, The property of the auditable object may be a null if the auditable object is not included in the webpage.

In some embodiments, the auditable object may be associated with a social media tag. In some embodiments, the social media tag may be an open graph tag. In some embodiments, the auditable object may be received from a user. In these and other embodiments, the property of the auditable object may also be determined by the user.

At block 308, an audit of each of the webpages may be performed according to the audit rule to determine the property of the auditable object for each of the webpages.

At block 310, the webpages may be grouped based on the property of the auditable object for each of the webpages. The webpages may be grouped based on similarities between the properties of the auditable objects of the webpages. For example, the webpages may be grouped based on the webpages containing a similar property of lacking an auditable object or lacking specific content within a content field of an auditable object.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The method 300 may further include receiving a user defined auditable object, wherein the user defined auditable object is the identified auditable object.

The method 300 may further include analyzing the property of the auditable object for each of the webpages to detect errors in the webpages. In these and other embodiments, the webpages may be grouped based on the webpages including similar errors. Alternately or additionally, the errors may be analyzed to determine a page template associated with one or more of the webpages that include the errors.

The method 300 may further include categorizing the errors according to severity, where the webpages are grouped based on the webpages that include errors of similar severity. In these and other embodiments, a user may define one or more of a severity of the errors, the auditable object, the property, audit rule, the errors that are detected, the website, the portion of the website, among other things.

The method 300 may further include generating a correction report that includes a recommendation for correcting the error in one of the webpages, wherein the recommendation is prioritized based on one or more of: a severity of the error, page type of the one of the webpages, and a revenue impact of the error.

The method 300 may further include performing another audit of each of the webpages according to the audit rule to determine the property of the auditable object for each of the webpages after changes are made to one or more of the webpages. In these and other embodiments, after performing the second audit, the property of the auditable object for each of the webpages may be analyzed to detect other errors in the webpages. The number of other errors may be compared to the number of errors during the initial audit to determine corrections or how the website is trending over time with regard to the number of errors.

The method 300 may further include correlating a change in one or more metrics associated with the webpages including the errors with a correction of one or more of the errors. The metrics associated with the webpages may include revenue attributable to the webpage, a number of conversions on the webpage, a number of visits to the webpage, rank of keywords associated with the webpage, a number of keywords associated with a webpage, a social media activity level of the webpage, a sentiment analysis of the webpage, a sentiment analysis of the social media website, among other metrics. The social media activity level of the webpage may indicate how the webpage is viewed by social media. How the webpage is viewed by social media may be determined by a number of social media posts that reference the webpage, indications of preferences for the webpages by social media users, a sentiment analysis, engagement level measurement, among other things.

The method 300 may further include crawling at least a portion of a second website to identify second webpages of the second website that each include the auditable object marker. A second audit may be performed of each of the second webpages according to the audit rule to determine the property of the auditable object for each of the second webpages. The property of the auditable object for each of the second webpages may be analyzed to detect second errors in the second webpages and a number of the second errors may be compared to a number of the first errors. By comparing the errors occurring on the first and second webpages, an entity, such as a company, individual, corporation, or other entity, may compare the first webpage to the second webpage. For example, if the auditable object relates to social media, an entity may compare its own webpages or compare its webpages with competitor webpages.

As an example of the method 300, the website may be a commercial website selling widgets that contains links to a social media site. An auditable object maker, such as, a widget that allows a user of the social media site to indicate a preference for the website may be contained on some of the webpages of the website. The website may be crawled to determine the webpages that contain the widget. The auditable object may be determined to be a tag that provides the title of the webpage to the social media site when a user indicates a preference for the webpage. A property of the auditable object may be the inclusion of the auditable object on the webpage. An audit rule may be configured to determine the property of the auditable object. An audit may be performed according to the audit rule. The webpages that include the tag may be grouped together and the webpages that do not include the tag may be grouped together. The webpages that do not include the tag may be detected as errors and reported to allow correction of the webpages that do not include the tag.

Figure 4:
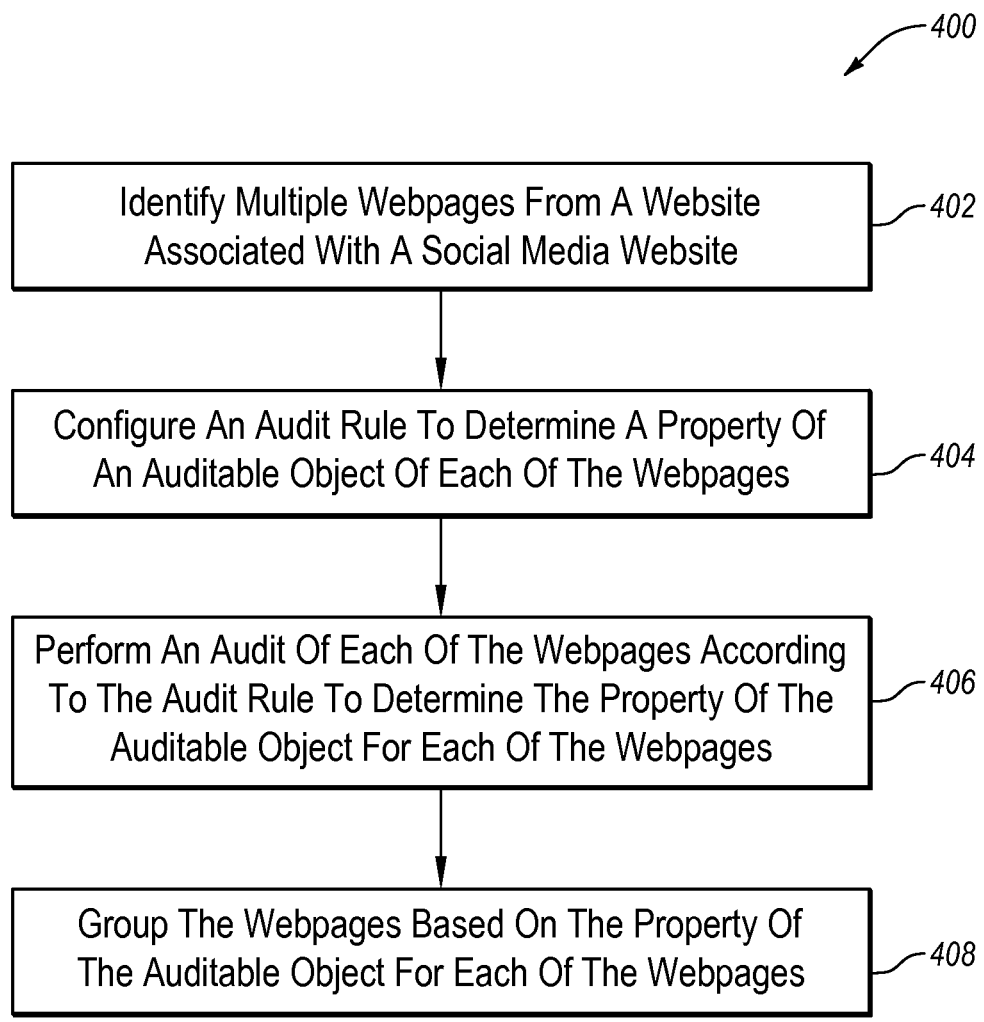
FIG. 4 is a flow chart of an example method of performing an audit of auditable objects.

FIG. 4 is a flow chart of an example method 400 of performing an audit of auditable objects, arranged in accordance with at least some embodiments described herein. The method 400 may be implemented, in some embodiments, by an auditing system, such as the system 100 of FIG. 1. For instance, the auditor 110 within the system 100 of FIG. 1 may be configured to execute computer instructions to cause the system 100 to perform operations for performing an audit of a website, as represented by one or more of blocks 402, 404, 406, and 408 of the method 400. Although illustrated as discrete blocks, various blocks may be divided into additional blocks, combined into fewer blocks, or eliminated, depending on the desired implementation.

The method 400 may begin at block 402, where multiple webpages may be identified from a website associated with a social media website. The webpages may be associated with the social media website by the social media website having a link to the webpage, the social media website referencing the webpage, or other interactions between the social media website and the webpage. The webpages associated with the social media website may be identified by crawling the webpages, the social media website, and/or other websites.

At block 404, an audit rule may be configured to determine a property of an auditable object of each of the webpages. The auditable object may be associated with the social media site.

At block 406, an audit of each of the webpages may be performed according to the audit rule to determine the property of the auditable object for each of the webpages.

At block 408, webpages may be grouped based on the property for each of the webpages.

The method 400 may further include generating a report indicating which of the webpages have a property of null for the auditable object. A property of null may indicate that a webpage does not include an auditable object.

In some embodiments, the method 400 may be implemented on a website to audit the website to detect and enable correction of errors of auditable objects in webpages of the website that are associated with the social media website. By detecting and correcting errors, the website may be better situated to gain benefits from the association with the social media website.

Figure 5:
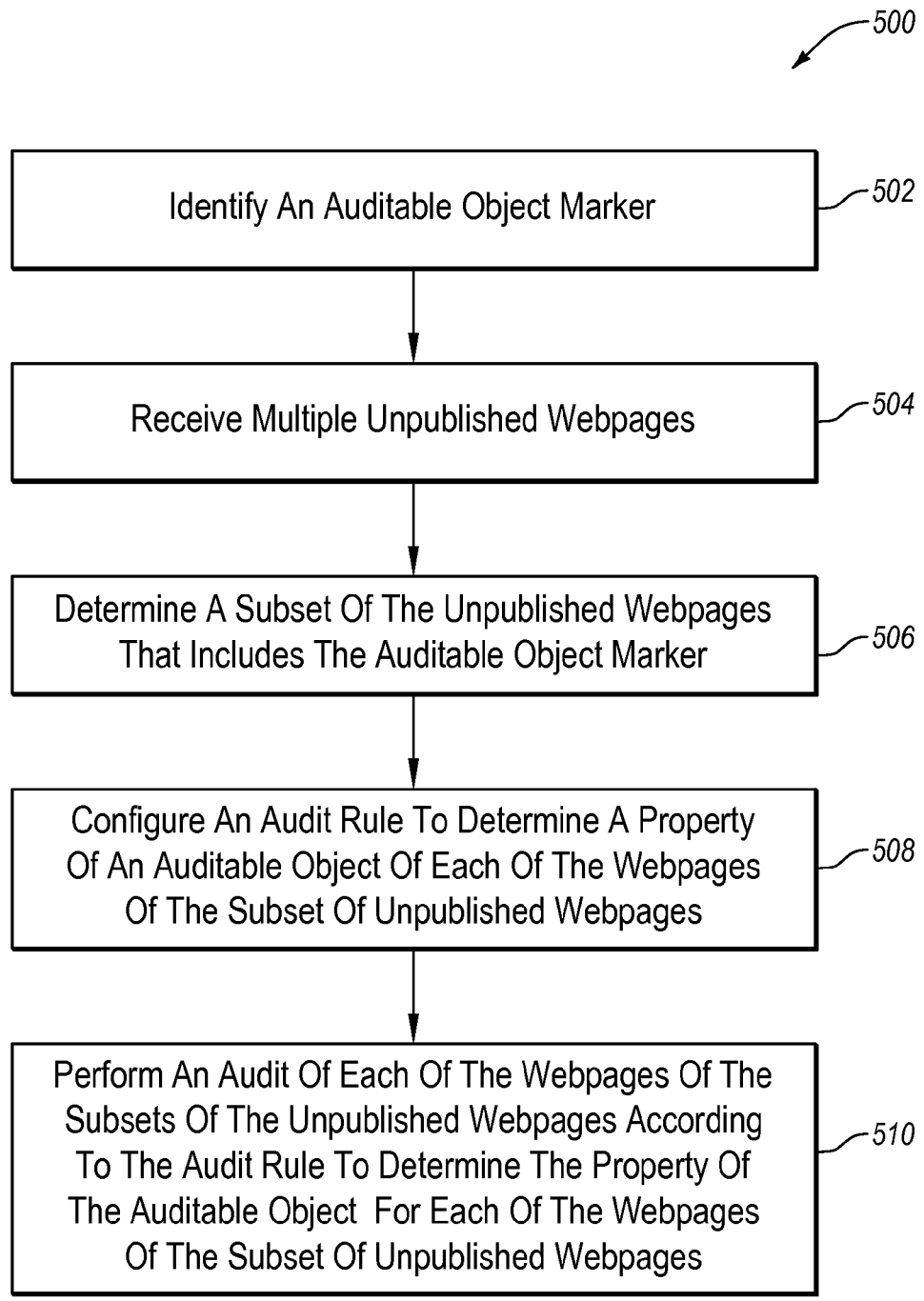
FIG. 5 is a flow chart of an example method of performing an audit of auditable objects.

FIG. 5 is a flow chart of an example method 500 of performing an audit of auditable objects, arranged in accordance with at least some embodiments described herein. The method 500 may be implemented, in some embodiments, by an auditing system, such as the system 100 of FIG. 1. For instance, the auditor 110 within the system 100 of FIG. 1 may be configured to execute computer instructions to cause the system 100 to perform operations for performing an audit of a website, as represented by one or more of blocks 502, 504, 506, 508, and 510 of the method 500. Although illustrated as discrete blocks, various blocks may be divided into additional blocks, combined into fewer blocks, or eliminated, depending on the desired implementation.

The method 500 may begin at block 502, where an auditable object marker may be identified.

In block 504, multiple unpublished webpages may be received.

In block 506, a subset of the unpublished webpages that includes the auditable object marker may be determined.

In block 508, an audit rule may be configured to determine a property of an auditable object of each of the webpages of the subset of the unpublished webpages.

In block 510, an audit of each of the webpages of the subsets of the unpublished webpages may be performed according to the audit rule to determine the property of the auditable object for each of the webpages of the subset of the unpublished webpages.

The method 500 may further include analyzing the property for each of the webpages of the subset of the webpages to detect errors in the webpages of the subset of the webpages.

In some embodiments, the method 500 may be implemented in the system 100 as described above where the system 100 is coupled to and/or include a CMS. In these and other embodiments, the CMS may send the unpublished webpages that are received. Alternately or additionally, the CMS may make corrections to the webpages with indicated errors before publishing the webpages to a network.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In an illustrative embodiment, any of the methods, systems, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the methods and systems described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described methods into data processing systems. That is, at least a portion of the methods described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components.

FIG. 6 is a block diagram of an example computing device 600 configured to implement some embodiments described herein, and arranged to perform any of the computing methods described herein. The computing system 600 may represent a user side computing device, such as a mobile smart phone, as well as an application marketplace search facilitating server, arranged in accordance with at least some embodiments described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (i.tP), a microcontroller (IC), a digital signal processor (DSP), or any combination thereof Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a auditing algorithm 626 that is arranged to perform the functions as described herein including those described with respect to methods of performing an audit of a website as described herein. Program Data 624 may include auditing information 628 that may be useful for auditing webpages, for example, the auditing information may include auditing rules and/or other information. In some embodiments, application 622 may be arranged to operate with program data 624 on operating system 620 such that multiple webpages may be audited as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (S SD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 may also be any type of network computing device. The computing device 600 may also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art tat if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method of performing an audit of auditable social media objects within webpages of a website, the method comprising:
    identifying an auditable object marker configured to be included in a webpage and to indicate that the webpage includes auditable social media objects, wherein the auditable social media objects are configured to allow one or more social media websites to extract information about the webpage that includes the auditable social media objects and display the extracted information in the one or more social media websites;
    crawling a portion of a website to identify a plurality of webpages of the website that each include the auditable object marker;
    configuring an audit rule to determine a property of an auditable social media object of each of the plurality of webpages, the auditable object marker associated with the auditable social media object;
    performing an audit of each of the plurality of webpages according to the audit rule to determine the property of the auditable social media object for each of the plurality of webpages;
    grouping the plurality of webpages based on the property of the auditable social media object for each of the plurality of webpages;
    analyzing the property of the auditable social media object for each of the plurality of webpages to detect errors in the plurality of webpages; and
    correlating, for one or more of the plurality of webpages with detected errors, a change in one or more of:
        a number of actions with respect to the one or more of the plurality of webpages by visitors to the one or more of the plurality of webpages,
        a number of visits to the one or more of the plurality of webpages, and
        keyword ranks on search result pages for the one or more of the plurality of webpages,
    with a correction of the detected errors in the one or more of the plurality of webpages.

2. The method of claim 1, further comprising receiving a user defined auditable social media object, wherein the user defined auditable social media object is the auditable social media object.

3. The method of claim 1, wherein the auditable social media object is a social media tag.

4. The method of claim 3, wherein the social media tag is an open graph tag.

5. The method of claim 1, wherein crawling at least the portion of the website to identify the plurality of webpages includes resolving and rendering non-html code segments to identify one or more of the plurality of webpages.

6. The method of claim 1, wherein crawling at least the portion of the website to identify the plurality of webpages of the website is performed based on a sitemap of the website.

7. The method of claim 1, wherein the plurality of webpages are grouped based on the plurality of webpages that include similar errors.

8. The method of claim 1, further comprising categorizing the errors according to severity, wherein the plurality of webpages are grouped based on the plurality of webpages that include errors of similar severity.

9. The method of claim 1, wherein a user defines one or more of a severity of the errors, the auditable social media object, the property, the audit rule, the errors that are detected, the website, and the portion of the website.

10. The method of claim 1, further comprising generating a correction report that includes a recommendation for correcting the errors in the plurality of webpages, wherein the recommendation is prioritized based on one or more of: a severity of the error, page type of the plurality of webpages, and a revenue impact of the error.

11. The method of claim 1, wherein the audit is a first audit and the errors are first errors, the method further comprising:
    performing a second audit of each of the plurality of webpages according to the audit rule to determine the property of the auditable social media object for each of the plurality of webpages after changes are made to one or more of the plurality of webpages;
    after performing the second audit, analyzing the property of the auditable social media object for each of the plurality of webpages to detect second errors in the plurality of webpages; and
    comparing a number of the second errors to a number of the first errors.

12. The method of claim 1, wherein the audit is a first audit and the errors are first errors, the method further comprising:
    crawling at least a portion of a second website to identify a second plurality of webpages of the second website that each include the auditable object marker;
    performing a second audit of each of the second plurality of webpages according to the audit rule to determine the property of the auditable social media object for each of the second plurality of webpages;
analyzing the property of the auditable social media object for each of the second plurality of webpages to detect second errors in the second plurality of webpages; and
comparing a number of the second errors to a number of the first errors.

13. The method of claim 1, further comprising analyzing the errors to determine a webpage template associated with one or more of the plurality of webpages that include the errors, the webpage template used as a predesigned web page usable to construct the one or more of the plurality of webpages that include the errors.

14. The method of claim 1, wherein the crawling at least the portion of the website to identify the plurality of webpages comprises crawling a selected portion of the website.

15. The method of claim 1, further comprising receiving the property of the auditable social media object from a user.

16. The method of claim 1, further comprising grouping the plurality of webpages based on a property of each of the plurality of webpages.

17. The method of claim 1, further comprising:
configuring a second audit rule to determine a second property of the auditable social media object of each of the plurality of webpages, wherein the audit of each of the plurality of webpages is performed according to the second audit rule to determine the second property of the auditable social media object for each of the plurality of webpages.

18. A method of performing an audit of auditable social media objects within webpages of a website, the method comprising:
identifying a plurality of webpages from a website;
configuring an audit rule to determine a property of an auditable social media object of each of the plurality of webpages, wherein the auditable social media object is an open graph tag associated with a social media website and the open graph tag is configured to allow the social media website to extract information about the webpage including the open graph tag and display the extracted information in the social media website;
performing an audit of each of the plurality of webpages according to the audit rule to detect errors in the auditable social media object for each of the plurality of webpages; and
correlating, for one or more of the plurality of webpages with detected errors, a change in one or more of:
a number of actions with respect to the one or more of the plurality of webpages by visitors to the one or more of the plurality of webpages,
a number of visits to the one or more of the plurality of webpages, and
keyword ranks on search result pages for the one or more of the plurality of webpages,
with a correction of the detected errors in the one or more of the plurality of webpages.

19. The method of claim 18, further comprising generating a report indicating which of the plurality of webpages have a property of null for the auditable social media object.

\* \* \* \* \*